US009870508B1

(12) United States Patent
Hodgson et al.

(10) Patent No.: US 9,870,508 B1
(45) Date of Patent: Jan. 16, 2018

(54) SECURELY AUTHENTICATING A RECORDING FILE FROM INITIAL COLLECTION THROUGH POST-PRODUCTION AND DISTRIBUTION

(71) Applicant: Unveiled Labs, Inc., Walnut Creek, CA (US)

(72) Inventors: Roderick Neil Hodgson, London (GB); Shamir Allibhai, San Francisco, CA (US)

(73) Assignee: Unveiled Labs, Inc., Walnut Creek, CA (US)

( * ) Notice: Subject to any disclaimer, the term of this patent is extended or adjusted under 35 U.S.C. 154(b) by 0 days.

(21) Appl. No.: 15/611,739

(22) Filed: Jun. 1, 2017

(51) Int. Cl.
| | |
|---|---|
| *H04N 9/80* | (2006.01) |
| *G06K 9/00* | (2006.01) |
| *G11B 27/10* | (2006.01) |
| *G11B 27/031* | (2006.01) |
| *H04N 21/266* | (2011.01) |
| *H04N 21/2347* | (2011.01) |
| *H04N 21/2343* | (2011.01) |

(52) U.S. Cl.
CPC ........ *G06K 9/00744* (2013.01); *G11B 27/031* (2013.01); *G11B 27/10* (2013.01); *H04N 21/2347* (2013.01); *H04N 21/23439* (2013.01); *H04N 21/26613* (2013.01)

(58) Field of Classification Search
CPC ......... G06K 9/00744; H04N 21/23439; H04N 21/2347; H04N 21/26613; G11B 27/031; G11B 27/10
USPC ........................................................ 386/241
See application file for complete search history.

(56) References Cited

U.S. PATENT DOCUMENTS

| | | | |
|---|---|---|---|
| 9,703,789 B2 * | 7/2017 | Bowman | G06F 17/30097 |
| 2013/0013880 A1 * | 1/2013 | Tashiro | H03M 7/30 |
| | | | 711/170 |
| 2017/0161304 A1 * | 6/2017 | Diggins | G06F 17/30268 |

* cited by examiner

*Primary Examiner* — William Tran
(74) *Attorney, Agent, or Firm* — Haynes Beffel & Wolfeld LLP; Ernest J. Beffel, Jr.

(57) ABSTRACT

The technology disclosed relates to data captured in streams from sensors. Streams often are edited, especially video and audio data streams. In particular, the technology disclosed facilitates identification of segments of an originally captured stream that find their way into a finally edited stream and identification of changed segments in the finally edited stream. Summary analysis on self-aligned meta-blocks of stream data is described, along with pushing at least some self-aligned meta-hashes into a blockchain network, applying an alignment and hashing procedure described in a smart contract.

23 Claims, 13 Drawing Sheets

SECURELY AUTHENTICATING A RECORDING FILE FROM INITIAL COLLECTION THROUGH POST-PRODUCTION AND DISTRIBUTION

FIELD OF THE TECHNOLOGY DISCLOSED

The technology disclosed relates to data captured in streams from sensors. Streams often are edited, especially video and audio data streams. In particular, the technology disclosed facilitates identification of segments of an originally captured stream that find their way into a finally edited stream and identification of changed segments in the finally edited stream. Summary analysis on self-aligned meta-blocks of stream data is described, along with pushing at least some self-aligned meta-hashes into a blockchain network, applying an alignment and hashing procedure described in a smart contract.

BACKGROUND

Data sets are increasingly under significant scrutiny, due to compliance and regulatory guidelines, unfolding laws around data privacy and residency, and a culture shift towards skepticism of online content (e.g., of so-called fake news). The increasing ease in video collection and editing has necessitated the need for distinguishing altered videos from unaltered videos. To solve this problem, data origin authentication and provenance tracking are used to ascertain the quality and lineage of data based on the data origin in a genesis device, its derivations, and the nodes it went through. It allows re-enactment of transformations to update the data of interest. It also helps to provide an audit trail for regulatory purposes.

An opportunity arises to securely authenticate a recording file from initial collection through post-production and distribution using blockchain-based smart contracts. Improved data origin authentication and provenance tracking and enhanced machine data integrity may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
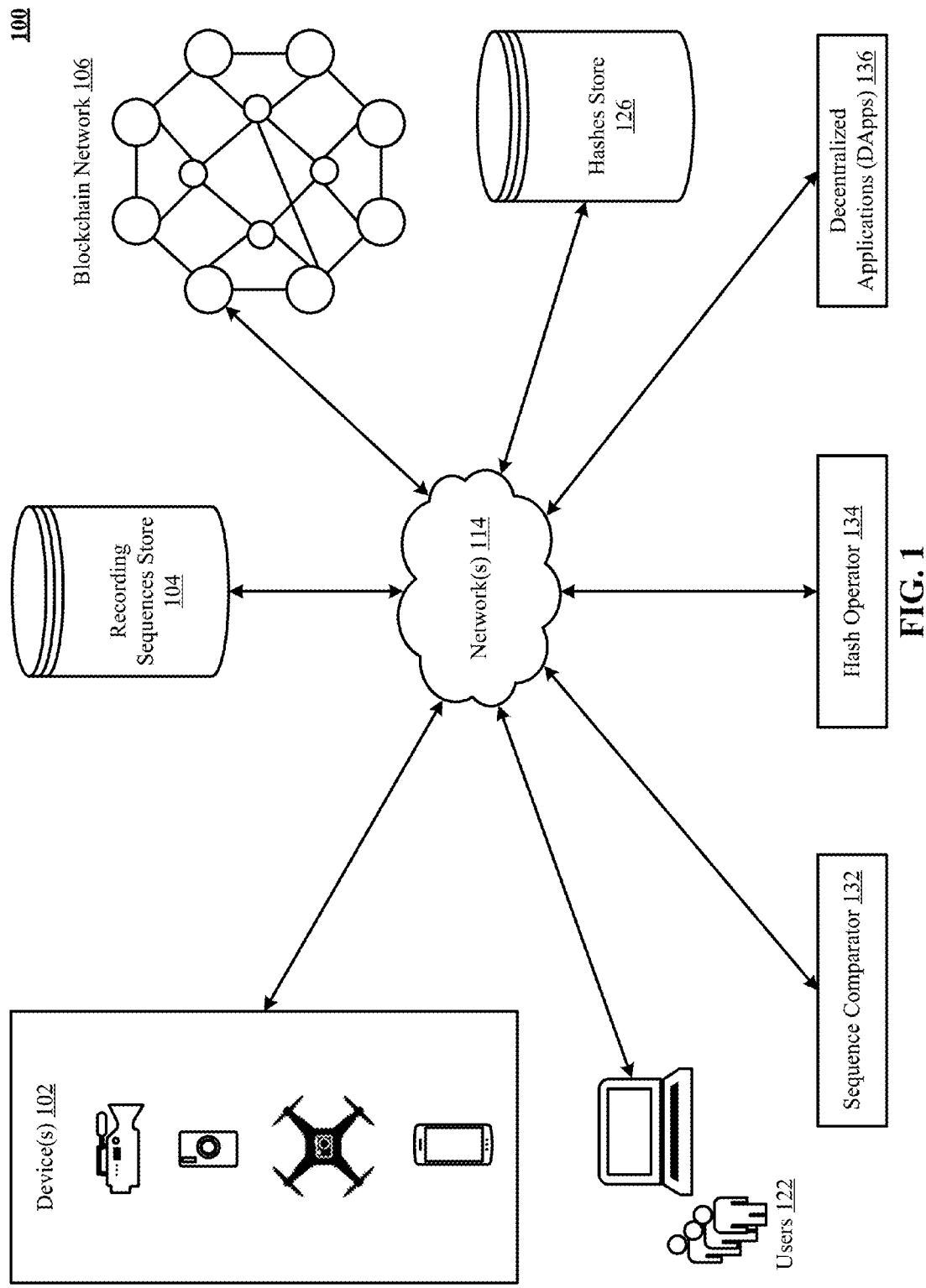
FIG. 1 shows an architectural level schematic of a system in accordance with an implementation.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Motivation

Due to the proliferation and accessibility of video recording, distribution, consumption, and post-production tools, the challenge and urgency to distinguish an edited video from its original is set to increase.

Each year, video technology continues to advance coupled with better battery life and cheaper storage. The general public can capture video on increasingly smaller and cheaper devices and together with the force of the mobile revolution, are capturing more and higher-quality video.

These trends have led to why wearable cameras are now usable and prevalent, and opened up the potential to capture video once out of human reach (e.g. GoPro™ cameras being put on a pelican bird to capture flight paths). Yet where the opportunity to record videos alone does not make a case for adoption of wearable cameras, pressure is coming from other spheres. Civil society today, as an example, often demands transparency from their government and sees visual evidence and other data to play a pivotal role in creating accountability. This is partly why there is growing adoption of body cameras and recording devices amongst police and emergency service providers.

In the near future, it may be commonplace for autonomous and semi-autonomous machines (like drones and autonomous vehicles) to roam on streets, in the air, in space, and underwater while also capturing, recording, transmitting, and processing visual, aural, and sensor data as part of their computer vision and decision-making systems. There will be guidelines to preserve these recordings for a set time period, or in perpetuity, for research, investigative, legal and posterity reasons.

These scenarios suggest that even more video will be recorded in the future. In tandem, the number of platforms to distribute and consume video has grown and will continue to grow. On YouTube™ purportedly hundreds of hours of video are uploaded every minute, millions of viewers come to the site daily, and billions of videos are viewed each day. A prodigious amount of content is also being created for and consumed on Facebook, Snapchat, Instagram, Twitter, and others. With the mobile revolution, watching videos has become ubiquitous and eminently accessible.

Separately, trends in post-production tools are making it increasingly difficult to distinguish between original and altered videos. Video editing and visual effects tools are advancing such as in their ability to make post-factum edits that are seamlessly and indistinguishably integrated into the original footage. A salient example includes the use of "digital resurrection" and computer-generated imagery techniques, such as those used in Rogue One: A Star Wars Story (Edwards, 2016). While the photorealistic depiction of actor Peter Cushing, known as "Grand Moff Tarkin" in the movie, is not an example of a malicious use of visual effects tools, the point is that these tools exist, are getting better, and will become accessible, based on the past trajectory of technology in general, to an increasing number of people, some of whom may have unsavory motivations.

There are numerous ways to alter data and numerous types of data stored and shared; post production tools used to edit video is just one example of a method and type of dataset. Techniques to alter data types will empower those who seek to malevolently purport falsehoods, and in the case of the prior example, by creating photorealistic alterations to videos. The discovery of such tampering will result in increased uncertainty of what is truthful, factual and accurate. Doubt will spread, users will grow skeptical, and scrutiny will increase.

The trend of advancing post production tools, irrespective of the other mentioned trends, would alone establish the need to identify altered videos. When coupled, though, with the growth in the ubiquity of video, they combine to create an environment conducive to not just the creation of but the spread of misleading information and add urgency to find a resolution. As an example, an increase in the quantity of recorded video, especially in critical, high-stakes situations, coupled with wider distribution means that there is a risk for an increased quantity of manipulated video, and for them to be spread across a range of channels to, arguably, more people.

Altogether, the superfecta of trends lay the foundation for the need of a trusted system that can authenticate original videos, audio, and sensor data—and their accurate derivatives—from altered ones.

Introduction

Post-production editing of an original video often creates an edited video with additional or fewer video frames. Additional frames can be prepended, postpended, or inserted anywhere in the content of original video. In any case, insertion or deletion of frames results in a shift in the position of data within a data file, causing misalignment of any hashes performed on subsections of the file (hash windows). However, creating a provenance trail from derivations of original data to the original data itself can be technically challenging because the hash windows get misaligned between the original data and its derivations, rendering hash sequences that are incomparable. The misalignment is acute when the data at issue is continuous media data such as videos.

The technology disclosed uses a modulo function to create aligned hash calculation windows between an original sequence and a derived sequence that are invariant to editing operations like prepending, postpending, insertion, and trimming. Because the values of the cryptographic hashes do not change between edits, the technology disclosed defines hash calculation windows based on the hash values, rather than relying on the position of the hash values.

In this disclosure "self-aligned" is used in the context of self-aligned meta-blocks and self-aligned meta-hashes. A self-aligned meta-block is defined with respect to meta-block boundaries generated by applying a modulo function, as described below. Self-aligned meta-blocks can be overlapping or abutting, as a designer prefers. An overlapping example would include two boundaries at the beginning and end of each block. A non-overlapping example would include only a left or right boundary in a block, so that no boundary would belong to two blocks. Once meta-blocks are defined using the self-aligning boundaries, a hash function is applied to the self-aligned meta-blocks to generate what we define as self-aligned meta-hashes.

The technology disclosed applies the modulo function on the cryptographic hash values and calculates remainder sequences. Among the remainder sequences are so-called zero remainder values that repeat after as many hash values as the dividend used in the modulo function. The recurring zero remainder values define so-called meta-block boundaries and meta-blocks of hash values that are aligned between the original video and the edited video. Hash of hashes are calculated over the meta-blocks to produce so-called self-aligned meta-hashes for the original video and the edited video. Self-aligned meta-hashes are comparable and can be matched to determine whether the edited video is an excerpt of the original video.

Also, the self-aligned meta-hashes are stored and validated on a blockchain network via smart contracts to provide an immutable assurance that data has not been tampered with, in addition to providing traceability and transparent auditing capabilities.

System Overview

We describe a system and various implementations of data origin authentication and machine data integrity using blockchain-based smart contracts. FIG. 1 shows an architectural level schematic of a system in accordance with an implementation. Because FIG. 1 is an architectural diagram, certain details are intentionally omitted to improve the clarity of the description.

The discussion of FIG. 1 will be organized as follows. First, the elements of the figure will be described, followed by their interconnections. Then, the use of the elements in the system will be described in greater detail.

FIG. 1 includes the system 100. The system 100 includes device(s) 102, recording sequences store 104, blockchain network 106, users 122, hashes store 126, sequence comparator 132, hash operator 134, decentralized applications (DApps) 136, and network(s) 114.

The interconnection of the elements of system 100 will now be described. Network(s) 114 couples the device(s) 102, the recording sequence store 104, the blockchain network 106, the users 122, the hashes store 126, the sequence comparator 132, the hash operator 134, and the DApps 136, all in communication with each other (indicated by solid double-arrowed lines). The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications. The engines or system components of FIG. 1 such as the sequence comparator 132, the hash operator 134, and the DApps 136 are implemented by software running on varying types of computing devices. Example devices are a workstation, a server, a computing cluster, a blade server, and a server farm.

Regarding blockchain network 106, blockchain is a distributed and public ledger which maintains records of all the transactions on the blockchain network 106 comprising suppliers of products and services and consumers. Blockchain network 106 is a peer-to-peer network and does not require a central authority or trusted intermediaries to authenticate or to settle the transactions or control the underlying infrastructure. Examples of popular blockchain platforms include Ethereum™, Eris™, Multichain™, Bitcoin™, Hyperledger Fabric™, and Hyperledger Corda™. Blockchain network 106 includes a distributed data structure comprising a chain of blocks.

Blockchain acts as a distributed database or a public ledger which maintains records of all transactions on a peer-to-peer network. A blockchain is maintained by a network of nodes where every node executes and records the same transactions. The blockchain structure is replicated among the nodes in the network. Any node in the network can read the transactions. The transactions are time-stamped and bundled into blocks where each block is identified by its cryptographic hash called the nonce. The blocks from a linear sequence where each block references the hash of the previous or parent block, forming a chain of blocks called the blockchain. Each block maintains records of all the transactions on the network received since the creation of its previous block. Instead of storing the information on all the transactions within the block itself, a special data structure called a Merkle tree is used to store the transactions and only the hash of the root of the Merkle tree is stored in the block.

New blocks are created and added to the blockchain in a process called mining. The nodes in the blockchain network 106 that perform the mining operations are called miners. New transactions are broadcast to all the nodes on the network. Each miner node creates its own block by collecting the new transactions and then finds a proof-of-work (PoW) for its block by performing complex cryptographic computations. The miners validate the transactions and reach a consensus on the block that should be added next to the blockchain. The newly mined block, called the winning block, is then broadcast to the entire network. The winning block is the one that contains a PoW of a given difficulty.

Blockchain is an immutable and durable data structure which maintains a record of the transactions that are tamper-resistant. Once a transaction is recorded in a block, it cannot be altered or deleted as long as a majority of the computational power of the network is not controlled by peers who collude to alter the blockchain.

While each miner on the blockchain network 106 can create its own block, only the block which has a PoW of a given difficulty is accepted to be added to the blockchain. The consensus mechanism ensures that all the nodes agree on the same block to contain the canonical transactions. Blockchain offers enhanced security as compared to centralized systems as every transaction is verified by multiple miners. The integrity of the transaction data recorded in the blocks is protected through strong cryptography. In addition to the transaction data, each block contains a cryptographic hash of itself and the hash of the previous block. Any attempts to modify a transaction would result in a change in the hash and would require all the subsequent blocks to be recomputed. This would be extremely difficult to achieve as long as the majority of miners do not cooperate to attack the network.

Blockchain network 106 can host smart contracts. A smart contract is a piece of code that resides on blockchain and is identified by a unique address. A smart contract includes a set of executable functions and state variables. The function code is executed when transactions are sent to the functions. The transactions include input parameters which are required by the functions in the contract. Upon the execution of a function, the state variables in the contract change depending on the logic implemented in the function. Smart contracts can be written in various high-level languages (such as Solidity™ or Python™). Language-specific compilers for smart contracts (such as Solidity™ or Serpent™ compilers) are used to compile the contracts into bytecode. Once compiled, the contracts are uploaded to the blockchain network 106 which assigns a unique address to each contract.

Decentralized applications (DApps) 136 are applications that use smart contracts. DApps 136 provide a user-friendly interface to smart contracts. A cryptocurrency application is an example of a DApp that runs on the blockchain network 106. A DApp comprises smart contracts and files for web user interface front-end (e.g., HTML, JavaScript, stylesheets, and images). In implementations, DApps 136 also serve has machine-interfaces directly accessible by devices, e. g., via application programming interfaces (APIs) responsive to Hypertext Transfer Protocol (HTTP) requests.

Device(s) 102 can leverage blockchain platforms to enable device-to-device and consumer-to-device transactions. Devices(s) 102 can have their own blockchain accounts and associated smart contracts. The smart contracts can store information on the device identities and usage patterns. Device(s) 102 can send transactions to the associated smart contracts and receive transactions from the peers on the blockchain network 106. This can be achieved by running a blockchain client on the device(s) 102 that uses a controller service to connect the device(s) 102 to the blockchain network 106. An example of a blockchain client is EthJsonRpc Python™ client for Ethereum™ that uses JSON-based remote procedure calls (RPCs) to implement client-specific methods and provides a high-level interface to create smart contracts on Ethereum™ and to call contract functions. When users 122 wish to avail the services of the device(s) 102, they can transact with the smart contracts associated with the device(s) 102.

Device(s) 102 can be a camcorder, a body camera, a camera equipped drone, a camera equipped smartphone, or a camera equipped vehicle (e.g., autonomous vehicle). Other examples of devices(s) 102 can include a video recording device, an audio recording device, a personal computing (PC) device such as a desktop or laptop computer, a media center device or other PC derivative, a personal video recorder, portable media consumption device (mobile terminal, personal digital assistant (PDA), gaming and/or media console, etc.), dedicated entertainment device, television, digital television set-top box, radio device or other audio playing device, other consumer electronic device, or the like.

Device(s) 102 are capable of providing one or more continuous media data sequences, referred to herein as recording sequences, in a number of different continuous media data formats. Recording sequences can be stored in recording sequences store 104. The continuous media data can be in an analog or digital form. Likewise, the device(s) 102 can be configured to record, encode, and/or compress the continuous media data using a number of different formats and standards. For example, formats for storing or streaming continuous media data can include AVI (Audio Video Interleave), ASF (Advanced Streaming Format), Matroska (MKV), ISOBMFF, and the like. Formats for encoding and/or compressing continuous media data (e.g., audio and video data) can include MPEG (Moving Pictures Expert Group) such as MPEG-2 or MPEG-4, M-JPEG (Motion JPEG (Joint Photographic Experts Group)), DivX;-), XviD, Third Generation Platform (3GP), AVC (Advanced Video Coding), AAC (Advanced Audio Coding), Windows Media®, (WMV), QuickTime® (MOV), Real-Video®, Shockwave® (Flash®), DVD-Video, DVD-Audio, Nero Digital, MP3 (MPEG-I), Musepack (MP+), Ogg, OGM, WAV, PCM, Dolby Digital (AC3), AIFF (Audio Interchange File Format), or the like.

Hash operator 134 applies hash functions and hash of hashes functions that are used to create fixed length digests of arbitrarily long input strings, referred to herein as hash sequences. Hash sequences are stored in the hashes store 126. Hash functions are keyless and provide the data integrity service. They are usually built using iterated and dedicated hash function construction techniques. Various families are available, such as MD, SHA-1, SHA-2, SHA-3, RIPEMD, and Whirlpool. As an example, SHA-2 category includes four functions defined by the number of bits of the hash: SHA-224, SHA-256, SHA-384, and SHA-512. In another example, SHA-3 family includes the following members: SHA3-224, SHA3-256, SHA3-384, and SHA3-512 as members. SHA-3 is a NIST-standardized version of the Keccak cryptographic hash function.

Hash operator 134 also applies arithmetic operations. The arithmetic operations can be modulo $2^{256}$ operations, such as modulo remainder (MOD) operation, signed modulo reminder (SMOD) operation, and modulo addition (ADD-MOD) operation.

Sequence comparator 132 compares two hash sequences and determines whether they match. Hash sequences can match in part or in entirety. Sequence comparator 132 does so by using sequence comparison algorithms such as Jaccard similarity, Euclidean distance, Cosine similarity, Levenshtein distance, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro-Winkler distance, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms, edit distance technique, and Soergel distance.

Having presented a system overview, the discussion now turns to self-aligned meta-hashes.

Self-Aligned Meta-Hashes

Figure 2A:
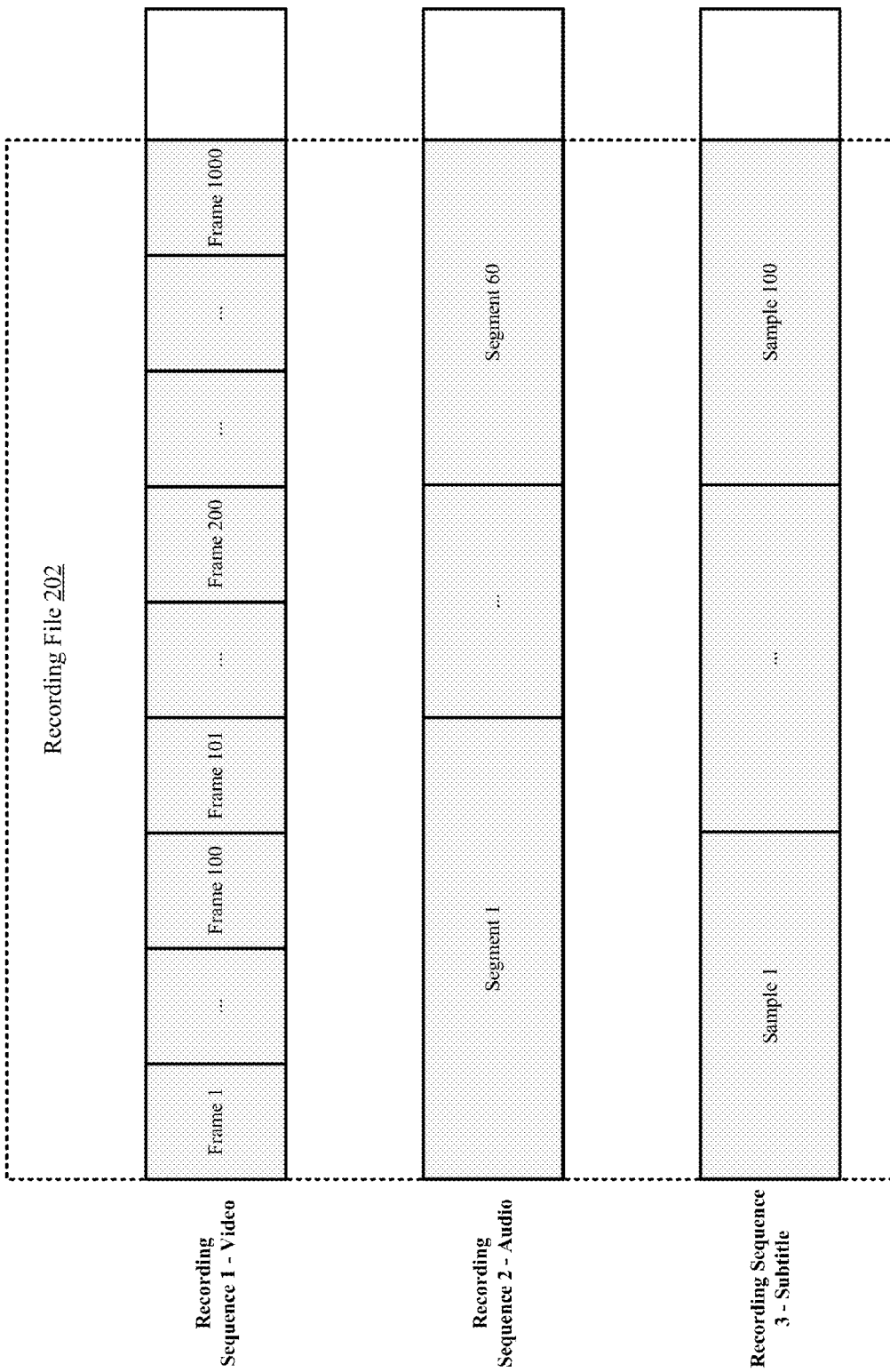
FIG. 2A is one implementation of a recording file with multiple recording sequences interleaved with each other.

FIG. 2A is one implementation of a recording file 202 with multiple recording sequences interleaved with each other. In example 200A, examples of recording sequences are recording sequence 1 for video, recording sequence 2 for audio, and recording sequence 3 for subtitle. Recording sequence 1 contains video frame elements 1 to 1000. Recording sequence 2 contains audio segments 1 to 60. Recording sequence 3 contains subtitle sample elements 1 to 100. In a Matroska (MKV) implementation, recording sequence 3 can be repurposed for recording a custom data format. Examples of custom data formats include location measurements (e.g., Global Positioning System (GPS) coordinates), bio response measurements (e.g., heart rate), altimeter measurements, bathymetry measurements, slope measurements, speed measurements, and temperature measures.

Figure 2B:
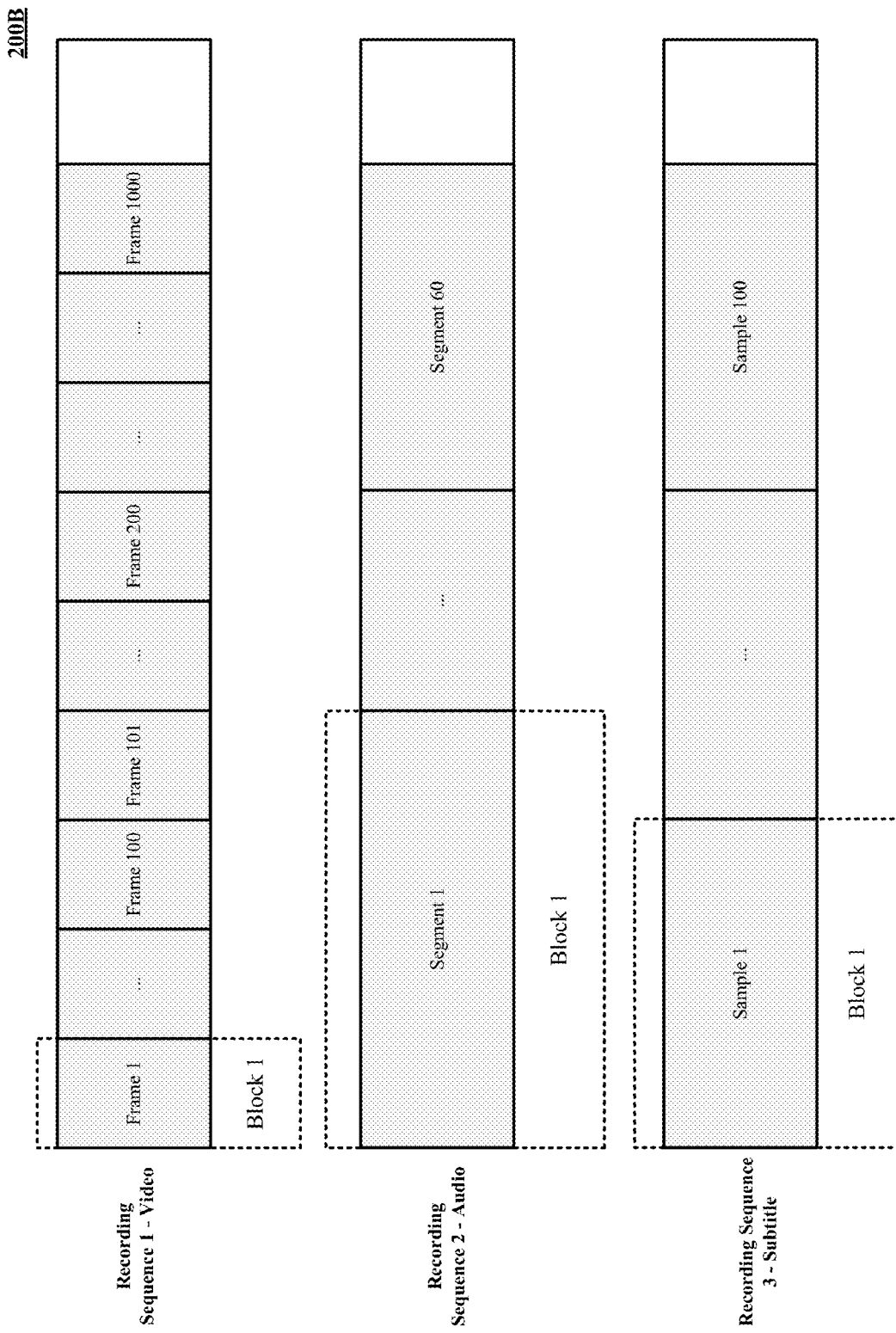
FIG. 2B depicts one implementation of block-level representation of individual elements of the recording sequences of FIG. 2A.

FIG. 2B depicts one implementation of block-level representation of individual elements of the recording sequences of FIG. 2A. In example 200B, for recording sequence 1, each individual frame element is represented as a block (e.g., frame 1 is represented as block 1). For recording sequence 2, each individual segment element is represented as a block (e.g., segment 1 is represented as block 1). For recording sequence 3, each individual sample element is represented as a block (e.g., sample 1 is represented as block 1).

Figure 2C:
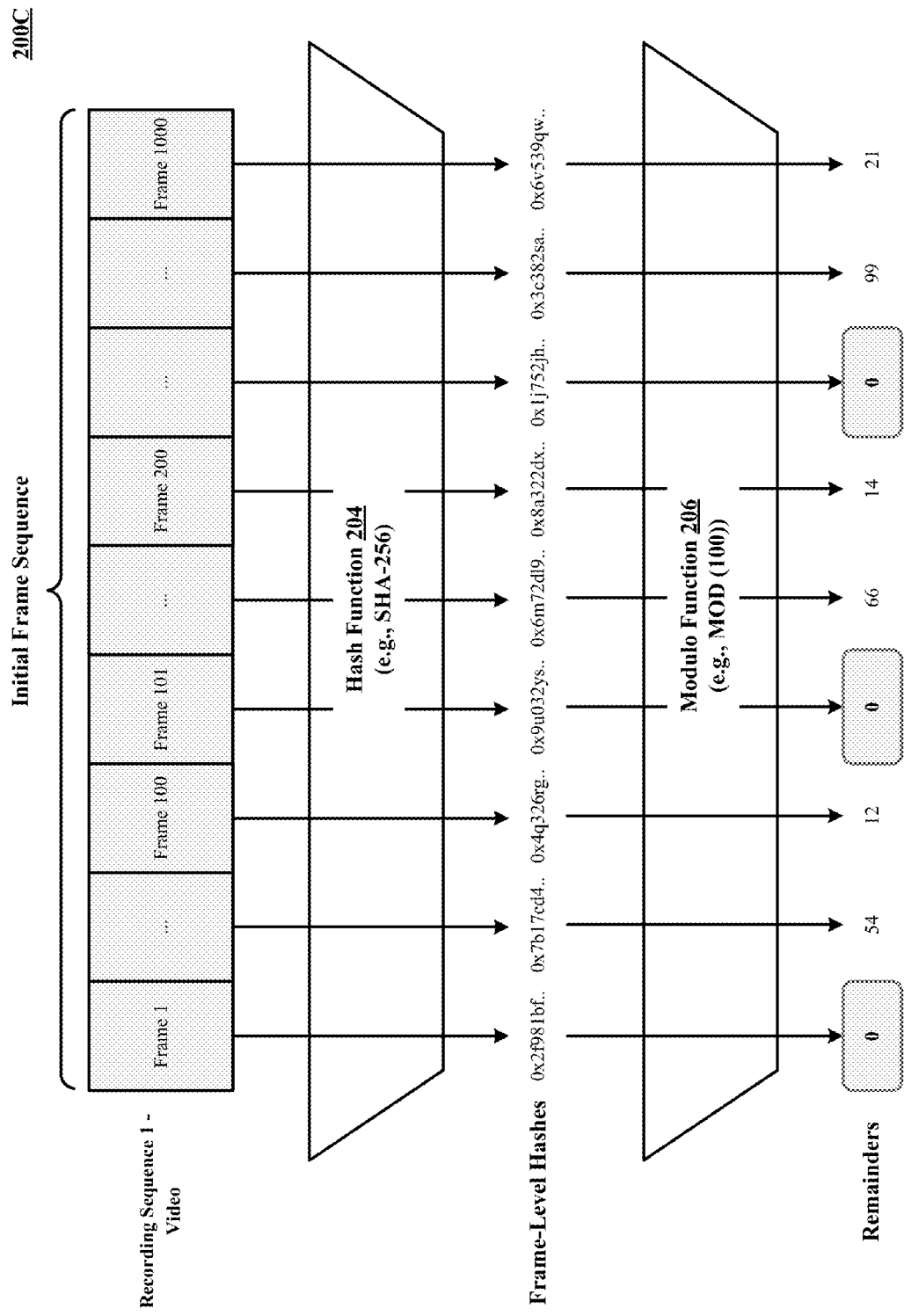
FIG. 2C illustrates one implementation of application of a modulo function to block-level hashes of an initially collected recording sequence.
Figure 2D:
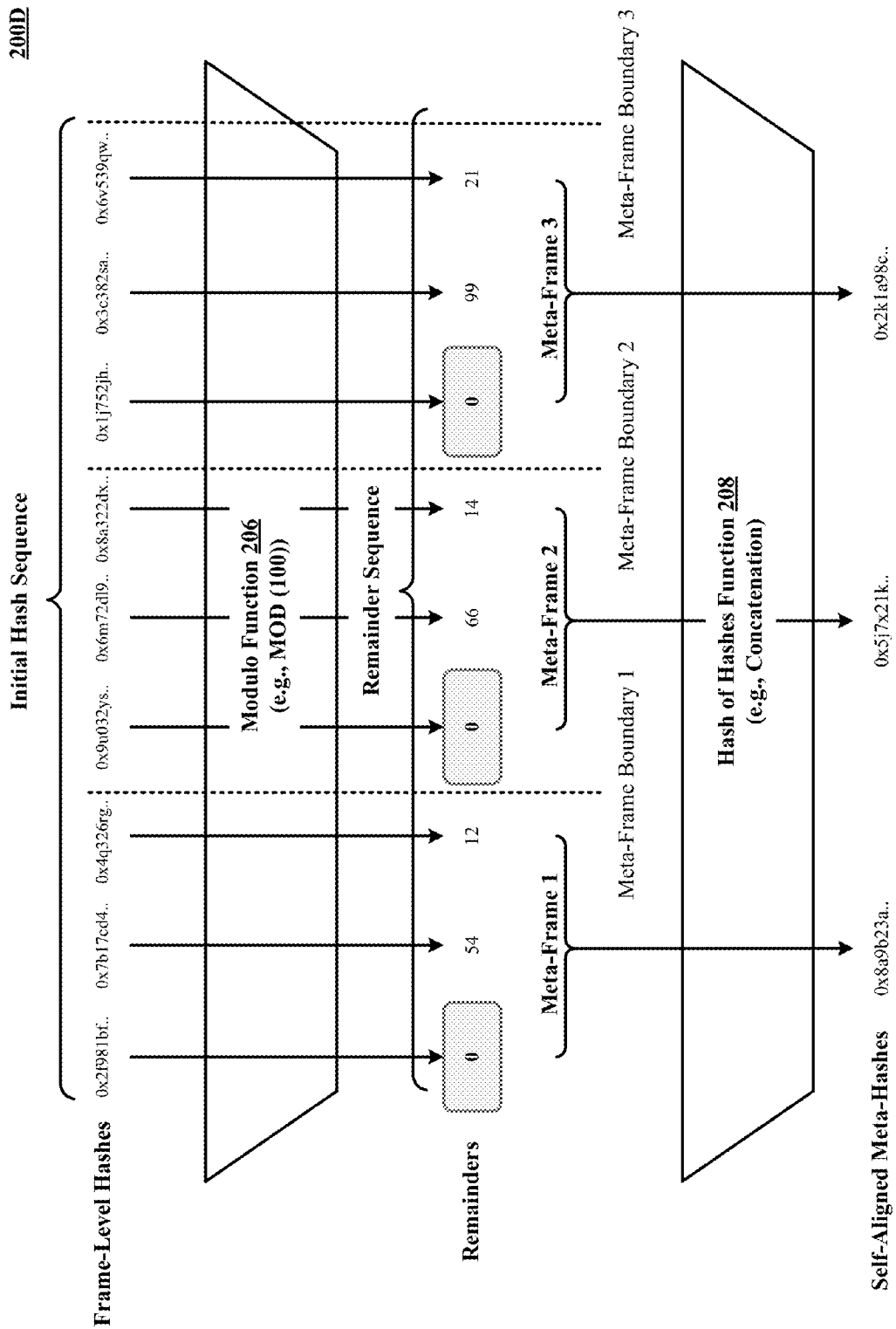
FIG. 2D depicts one implementation of producing self-aligned meta-hashes for the initially collected recording sequence of FIG. 2C.

FIG. 2C illustrates one implementation of application 200C of a modulo function to block-level hashes of an initially collected recording sequence. In FIG. 2C, recording sequence 1 is considered to be the initial frame sequence or the initially collected recording sequence. Recording sequence 1 is subjected to block hashing by a hash function 204 (e.g., SHA-256) that produces a hash sequence of thousand block-level hashes, one for each of the thousand blocks. In FIG. 2C, the block-level hashes are represented as frame-level hashes because the example shown in FIG. 2C pertains to recording sequence 1 for video.

The block-level hashes are then provided to a modulo function 206 that produces a remainder sequence of thousand remainders, one for each of the thousand block-level hashes. The dividend for the modulo function 206 can be based on a number of hashes to be generated, on average, per length of a recording sequence. In the example shown in FIG. 200C, a dividend of hundred is used for recording sequence 1. In other cases, a different dividend can be used. Also, modulo function 206 can be applied to a selected subset of bits within a block-level hash that is fewer than all of the bits of the block-level hash. So, for instance, if a block-level hash contains sixty four bits, modulo function 206 can be applied just to the leading eight bits.

The remainder sequence repeats a key remainder value of zero whenever a block-level hash value is a multiple of the dividend used in the modulo function 206. Thus, a key remainder value is defined as a zero remainder value. Similarly, a key block-level hash value is defined as a hash value which, when divided by a current dividend, produces no remainder, i.e., the hash value is divisible by the current dividend. On average, when using hash functions which generate uniform (or near-uniform) output, in a remainder sequence, the recurrence of zero remainder values takes place after as many instances of the block-level hashes as the value of the dividend. So, for MOD (100), a zero remainder value occurs every hundred block-level hashes, as shown in FIG. 2C.

The recurring key remainder values are then used to identify meta-block boundaries in the hash sequence. That is, a meta-block boundary is defined at every block-level hash in the hash sequence that corresponds to a key remainder value in the remainder sequence. In example 200D, three meta-block boundaries are identified for three key remainder values of zero, namely, meta-frame boundary 1, meta-frame boundary 2, and meta-frame boundary 3. Block-level hashes between two consecutive meta-block boundaries are defined as meta-blocks. In example 200D, three meta-blocks are defined, namely, meta-frame 1, meta-frame 2, and meta-frame 3.

For a given meta-block, the comprising block-level hashes are group hashed to produce a self-aligned meta-hash for that meta-block. This is done for every meta-block defined for the hash sequence. Group hashing can be done by concatenating the block-level hashes of a particular meta-block, and providing the concatenation to a hash of hashes function 208 that calculate a representative hash. This representative hash serves as the self-aligned meta-hash for that meta-block. In other cases, techniques like Merkle tree, Radix tree, and Patricia tree can be used to produce the self-aligned meta-hashes.

In the case of recording sequence 1 for video, the block-level hashes are frame-level hashes, the meta-block boundaries are meta-frame boundaries, the meta-blocks are meta-frames, and the block sequences are frame sequences. In the case of recording sequence 2 for audio, the block-level hashes are segment-level hashes, the meta-block boundaries are meta-segment boundaries, the meta-blocks are meta-segments, and the block sequences are segment sequences. In the case of recording sequence 3 for subtitle, the block-level hashes are sample-level hashes, the meta-block boundaries are meta-sample boundaries, the meta-blocks are meta-samples, and the block sequences are sample sequences.

Having described a generation of self-aligned meta-hashes, the discussion now turns to how the self-aligned meta-hashes can be used to securely authenticate a recording file from initial collection through post-production.

Figure 3A:
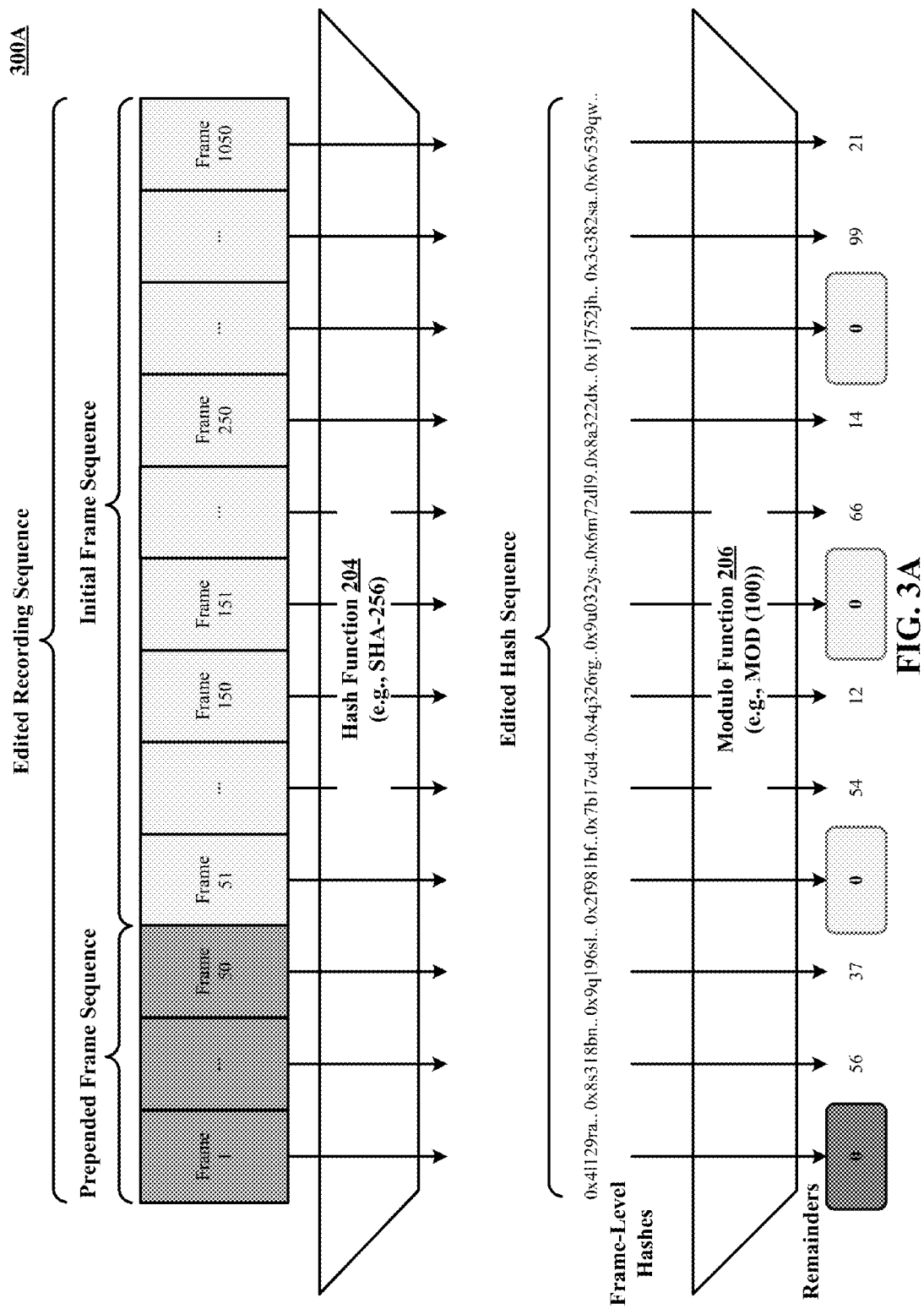
FIGS. 3A-3B show one implementation of using self-aligned meta-hashes to securely authenticate a prepended recording sequence.
Figure 3B:
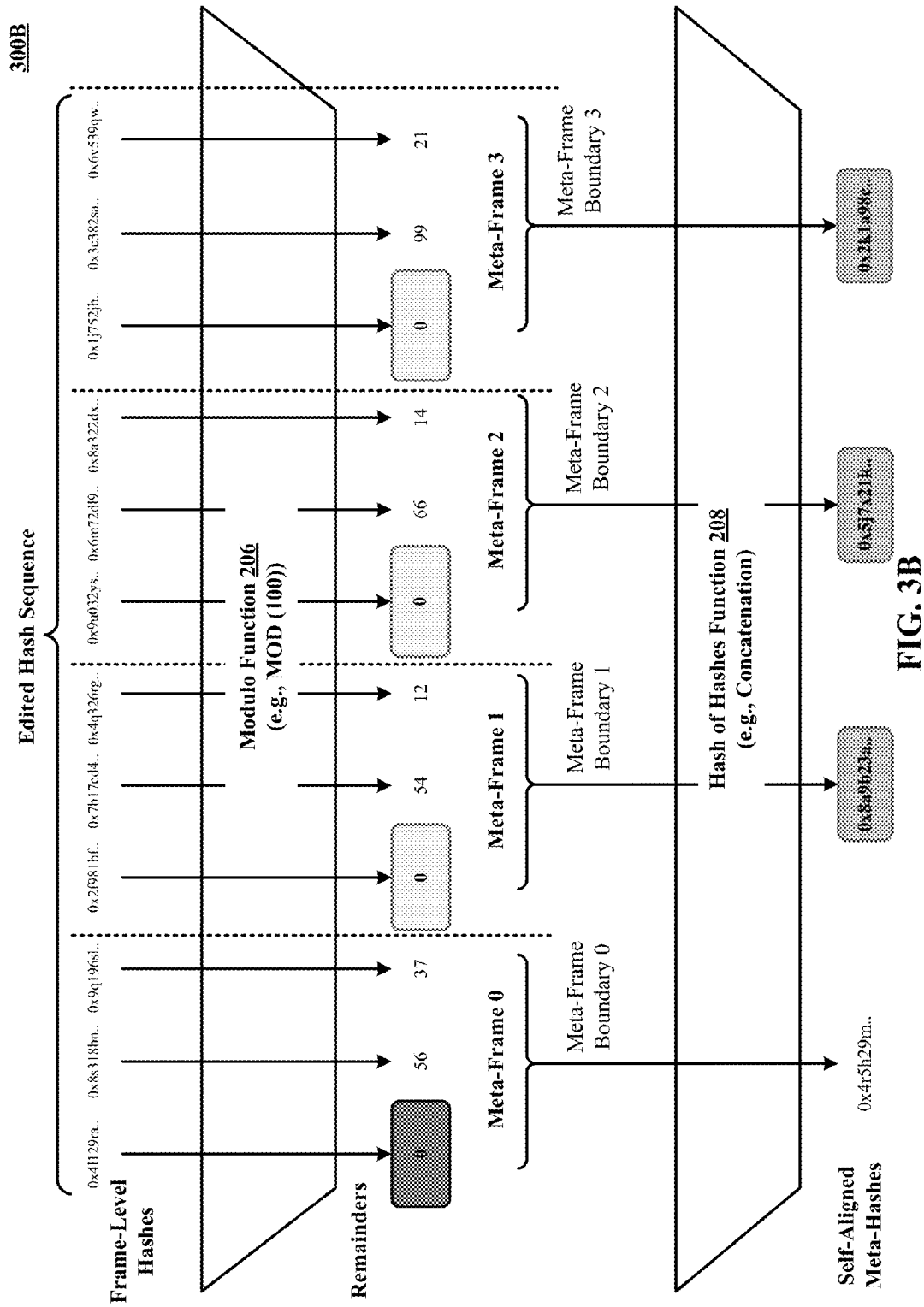

In FIG. 3A, the initially collected recording sequence of FIG. 2C is subjected to post-production editing that includes prepending it with a prepended frame sequence. The combination of the prepended frame sequence and the initial frame sequence is referred to herein as an edited recording sequence. The edited recording sequence is subjected to the same hash function 204 as the initial frame sequence to generate an edited hash sequence of block-level hashes. Accordingly, the edited hash sequence includes the initial hash sequence prepended with block-level hashes for the prepended frame sequence.

The edited hash sequence is then provided to the same modulo function 206 as the initial frame sequence. The same dividend used to generate the remainder sequence for the initial frame sequence is used to generate a remainder sequence for the edited recording sequence. Thus, in example 300B, MOD (100) is used to generate remainders for the edited hash sequence. As in the case of the initial frame sequence, the key block-level hash values for the edited hash sequence are defined as the hash values for which the modulo function 206 returns no remainder, i.e., zero remainder values.

Since the same hash function and the same modulo function dividend are used to generate the block-level hashes and the remainders for the initial and the edited recording sequences, the initial and the edited recording sequences have aligned key block-level hash values. Aligned key block-level hash values produce aligned zero remainder values in the remainder sequences of the initial and the edited recording sequences. Aligned zero remainder values produce aligned meta-block boundaries (e.g., meta-frame boundaries 1, 2, and 3) and aligned meta-frames (e.g., meta-frames 1, 2, and 3). Group hashing of aligned meta-frames produces self-aligned meta-hashes for the edit recording sequence.

Self-aligned meta-hashes of the initial and the edited recording sequences are compared by the sequence comparator 132 to identify one or more matching meta-hashes between the initial recording sequence and the edited recording sequence. A match indicates that the two recording sequences contain one or more overlapping blocks or block sequences and thus confirms that the edited recording sequence contains an excerpt of the initial recording sequence.

Figure 4A:
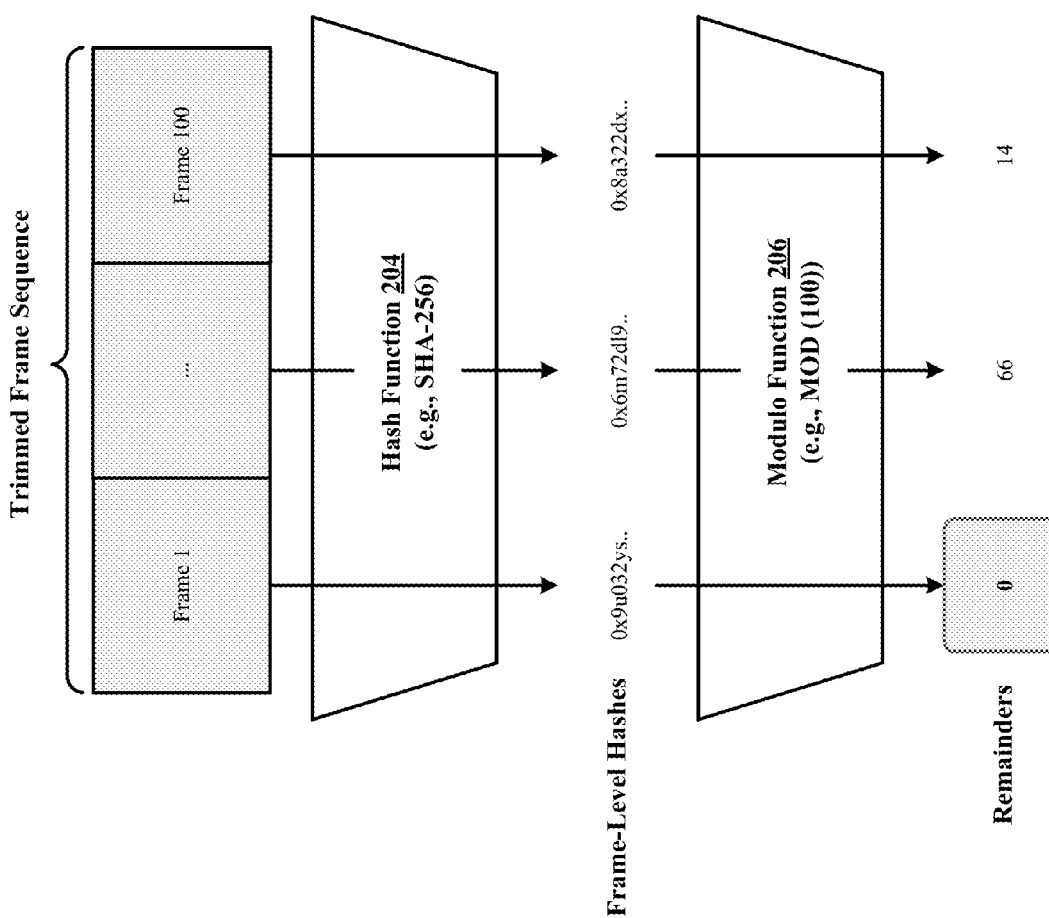
FIGS. 4A-4B illustrate one implementation of using self-aligned meta-hashes to securely authenticate a trimmed recording sequence.
Figure 4B:
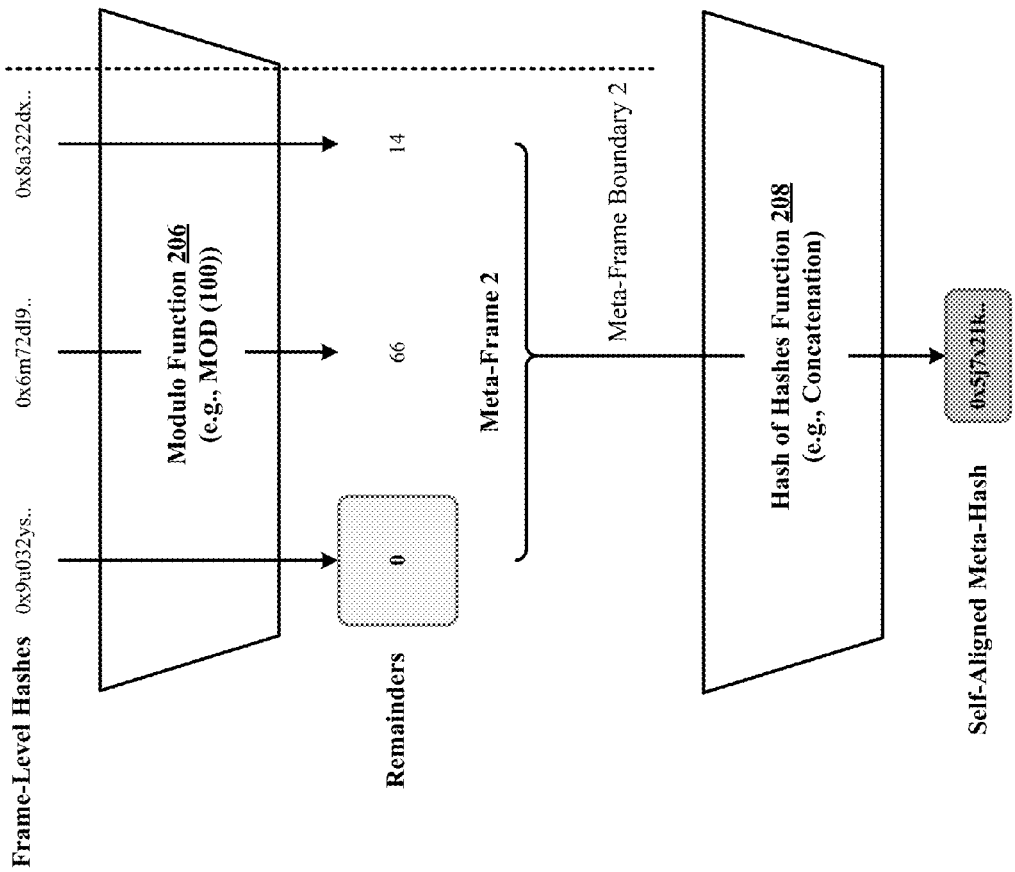

FIGS. 4A-4B illustrate one implementation of using self-aligned meta-hashes to securely authenticate a trimmed recording sequence. In example 400A, post-production editing produces a trimmed frame sequence. The trimmed frame sequence is subjected to the same hash function and the same modulo function dividend as the initial recording sequence, which results in the edited and the trimmed recording sequences having aligned key block-level hash values and aligned zero remainder values. This in turn produces aligned meta-block boundaries (e.g., meta-frame boundary 2) and aligned meta-frames (e.g., meta-frame 2), as shown in example 400B. Accordingly, self-aligned meta-hashes of the initial and the trimmed recording sequences are compared by the sequence comparator 132 to identify one or more matching meta-hashes between the initial recording sequence and the trimmed recording sequence. A match indicates that the two recording sequences contain one or more overlapping blocks or block sequences and thus confirms that the trimmed recording sequence is an excerpt of the initial recording sequence.

In other implementations, it would be apparent to one skilled in the art that frames can be inserted anywhere in the content of data (e.g., in the middle of an original sequence) to create an edited sequence with additional frames. In such a case, the self-aligned meta-hashes for non-inserted block-level hashes of the edited sequence can be matched with corresponding self-aligned meta-hashes of the original sequence.

In yet other implementations, nested levels of hashes of hashes can be generated such as self-aligned uber-hashes can be generated from self-aligned super-hashes, which in turn can be generated from self-aligned meta-hashes. In addition, block-level hashes can be subjected to multiple modulo functions with different dividend values producing various remainder sequences. Varying remainder sequences can be used to generate varying meta-block boundaries and varying meta-blocks. Varying meta-blocks can be used to generate multiple self-aligned meta-hash sequences. In implementations, multiple self-aligned meta-hash sequences for a single recording sequence can be stored in storage block(s) on the blockchain network 106.

Implementations of the technology disclosed can be used to authenticate CGI-enhanced videos. In such implementations, self-aligned meta-hashes for an original video and a CGI-enhanced videos can be compared to detect the CGI edits made to the original video. One skilled in the art would appreciate that the technology disclosed herein can be applied to other video processing tasks as well.

Having described secure authentication of a recording sequence using self-aligned meta-hashes, the discussion now turns to data origin authentication of recording sequences using blockchain-based smart contracts.

Blockchain-Based Smart Contract

Figure 5:
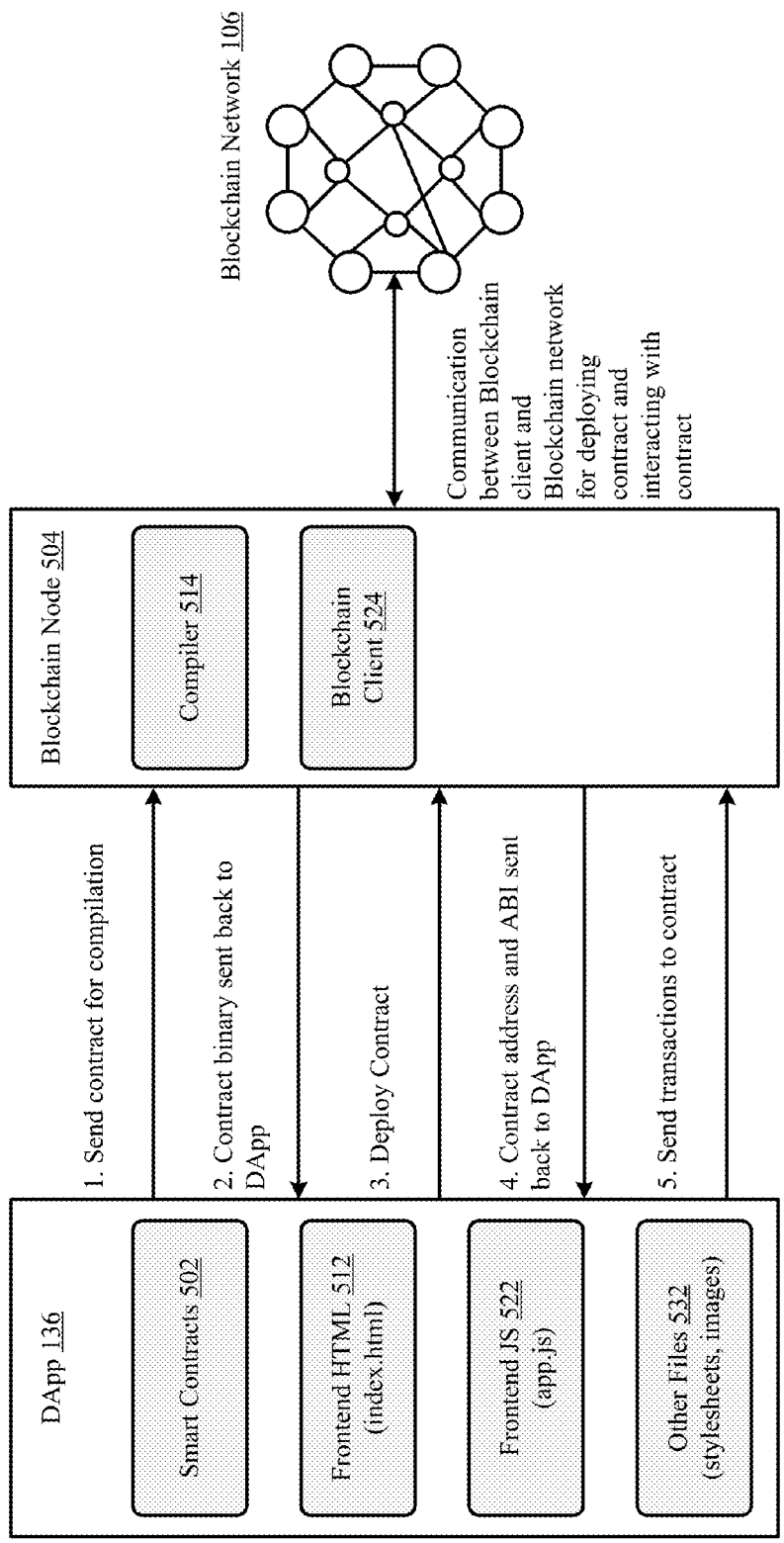
FIG. 5 is a block diagram with an example decentralized application (DApp) that can be used to implement the technology disclosed.

FIG. 5 is a block diagram 500 with an example decentralized application (DApp) 136 that can be used to implement the technology disclosed. DApp 136 is used to store the self-aligned meta-hashes in the tamper-proof blockchain network 106. DApp 136 is decentralized in nature, with no single entity or organization controlling the infrastructure on which the applications are deployed. In the context of Ethereum™, DApp 136 is backed by smart contracts 502 which are deployed on the Ethereum™ blockchain platform that is maintained by the Ethereum™ nodes or peers worldwide. Even though DApp 136 is deployed on a central server which is either a full Ethereum™ node or a can communicate with an Ethereum™ node, the server only serves the DApp's web interface. The DApp logic is controlled by the associated smart contracts 502 which are deployed on the blockchain network 106. DApp 136 provides a friendly interface to smart contracts 502 where the users 122 can submit transactions to the contracts from a web interface based on frontend HTML 512, frontend JavaScript (JS) 522, and other files 532 like stylesheets and images. A DApp's web interface forwards the transactions to the blockchain platform and displays the transaction receipts or state information in the smart contracts 502 in the web interface. DApp 136 can use a decentralized messaging protocol such as Whisper™ for communication and decentralized storage platforms such as Swarm™ for static storage.

In example 500, DApp 136 sends a smart contract to the blockchain node 504 for compilation. Blockchain node 504 comprises a compiler 514 and a blockchain client 524. Compiler 514 can compile smart contracts written in various high-level languages such as Solidity™, Serpent™, and Lisp™. Blockchain client 524 communicates with the blockchain network 106 and performs tasks such as creating accounts and contracts, sending transactions to contracts, and others. Examples of blockchain clients 524 include geth (written in Go™) and pyethapp (written in Python™)

In response, the blockchain node 504 sends the contract binary to DApp 136. This allows DApp 136 to deploy the contract on the blockchain node 504. Once the contract is deployed, the blockchain node 504 sends a contract address and an application binary interface (ABI) to DApp 136. ABI provides an interface to the state variables and functions defined in the deployed contract. After this, DApp 136 sends transactions to the deployed contract.

Figure 6:
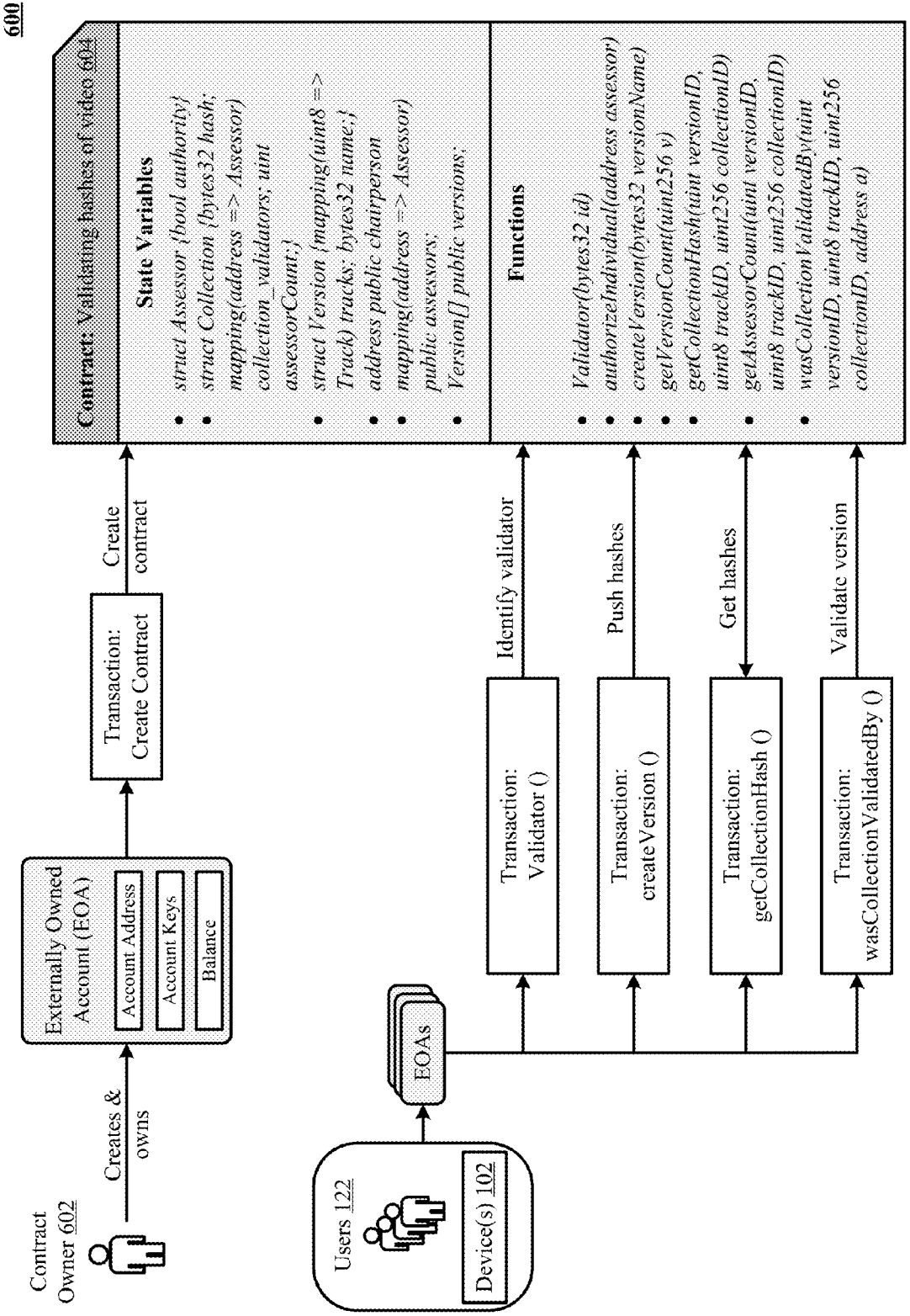
FIG. 6 shows an example workflow in which a smart contract implements the technology disclosed.

FIG. 6 illustrates an example workflow 600 in which a smart contract 604 implements the technology disclosed. Workflow 600 is described in reference to the Solidity™ code provided later in this application. First, contract owner 602 creates the smart contract 604 called "Validating hashes of video" (e.g., "contract Validator") via an externally owned account (EOA). EOA has a public-private key pair associated with it. The account address (e.g., "address public chairperson") is derived from the public key. When a new EOA is created, a JSON key file is created which has the public and private keys associated with the account. The private key is encrypted with the password which is provided while creating the account. For sending transactions to other accounts, the private key and the account password are required. The contract account is controlled by the associated contract code which is stored with the account. The contract code execution is triggered by transactions sent by the EOA. In implementations, smart contract 604 can be created by device(s) 102.

Transactions are the messages sent by EOAs to other EOAs or contract accounts. Each transaction includes the address of the recipient, transaction data payload, and a transaction value. When a transaction is sent to an EOA, the transaction value is transferred to the recipient. When a transaction is sent to a contract account, the transaction data payload is used to provide input to the contract function to be executed.

Smart contract 604 is used to store and validate the self-aligned meta-hashes. Smart contract 604 includes state variables (e.g., "struct Track", "struct Version", "Version[ ] public versions") that can store and identify different versions of a recording file, with self-aligned meta-hashes for different recording sequences of the recording file identified as separate tracks. In addition, smart contract 604 also includes state variables (e.g., "struct Assessor", "struct Collection") that can store and identify data origin validation of given version by one or more validators.

Smart contract 604 also includes functions (e.g., "createVersion") that can be used by users 122 and device(s) 102 to send the self-aligned meta-hashes to the smart contract 604 and in turn to the blockchain network 106. In implementations, a single function can be used to send meta-hashes for the entire recording file or separate functions can be used for individual recording sequences of the recording file. Similarly, smart contract 604 includes functions (e.g., "getCollectionHash") that can be used by users 122 and device(s) 102 to get the self-aligned meta-hashes stored on the blockchain network 106. Smart contract 604 also includes functions (e.g., "wasCollectionValidatedBy") that allow users 122 and device(s) 102 to validate a version stored on the blockchain network 106. Smart contract 604 also includes functions (e.g., "Validator") that allow users 122 and device(s) 102 to identify themselves by sending their account addresses to the smart contract 604.

Having described smart contract-based implementation of the technology disclosed, the discussion now turns to some example use cases.

Example Use Case

Figure 7:
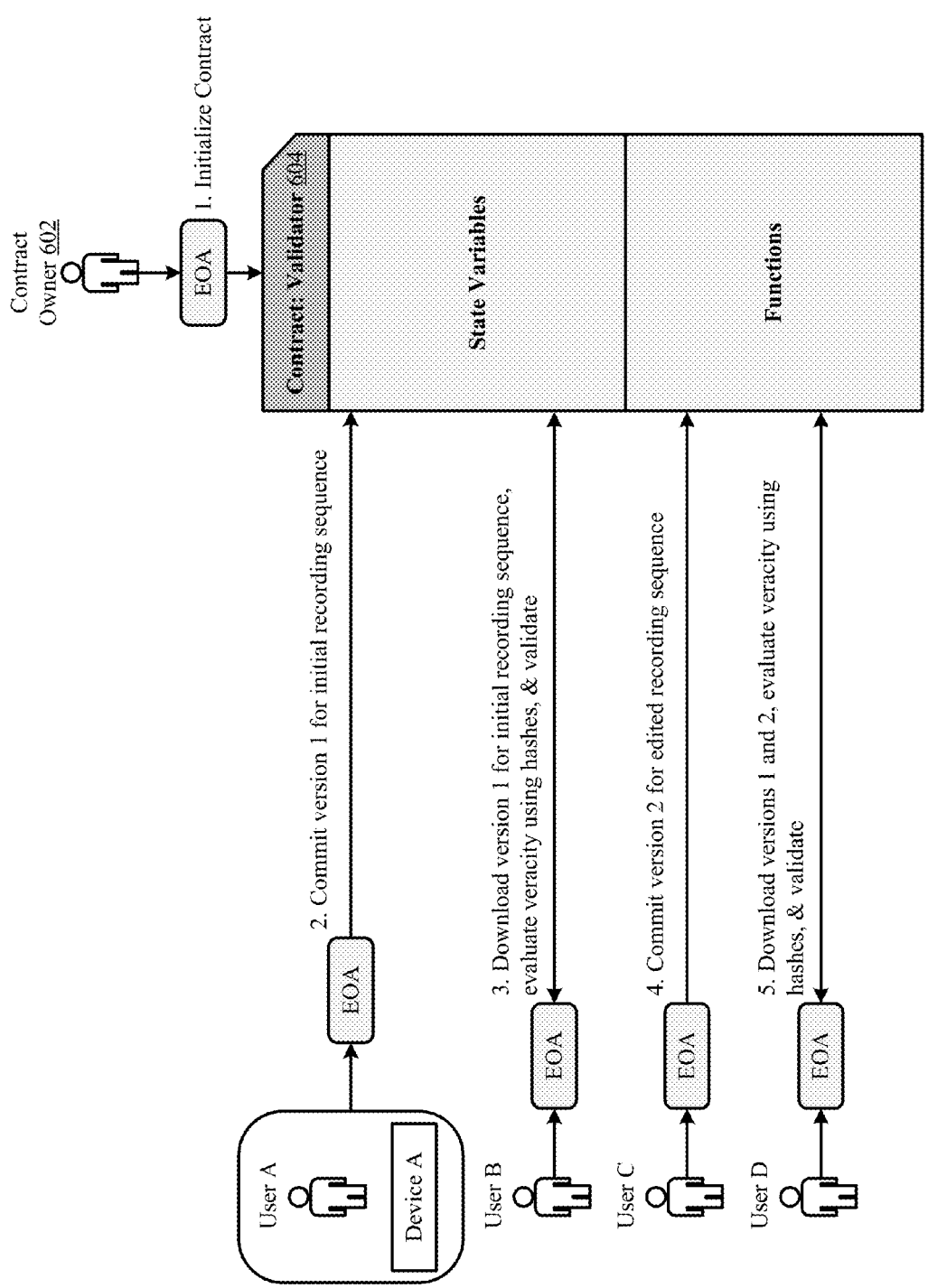
FIG. 7 depicts an example use case in which the smart contract of FIG. 6 is used to securely authenticate a recording file from initial collection through post-production.

FIG. 7 depicts an example use case 700 in which the smart contract 604 of FIG. 6 is used to securely authenticate a recording file from initial collection through post-production. The technology disclosed provides a way to securely authenticate a recording file from initial collection through post-production. Consider that a law enforcement agency creates smart contract 604 on the blockchain network 106 with a policy goal of ensuring data integrity and creating a provenance trail of evidentiary video footage of a witnessed event. The video footage can be recorded by a recording device such as a police body camera, a security camera, a drone, or a vehicle. The video footage can also include geo-location data identifying the location of the event. It can also include bio-response measurements (e.g., heart rate) of the police officers indicating a state of mind of the police officers during the event.

To persist and authenticate the origin of the video footage, a recording device A can be configured to generate self-aligned meta-hashes of the video footage and automatically send those meta-hashes to the smart contract 604. In other implementations, a first custodian (e.g., user A) of the video footage can upload the meta-hashes to smart contract 604. These meta-hashes can be stored on the blockchain network 106 as a first version (version 1) of the video footage.

Accordingly, when another user B, such as a journalist, receives a local copy of the video footage from the law enforcement agency, to ensure that the original footage has not been tampered with, user B can generate self-aligned meta-hashes for the local copy of the video footage and compare them with those stored on the blockchain network 106 as version 1. This may require the law enforcement agency giving user B access to smart contract, in addition to the video footage (which can be provided separately).

After comparing the meta-hashes for the local copy and the blockchain version, user B can determine the veracity of the local copy. If local copy is unaltered, user B can validate version 1 and store the validation on the blockchain network 106 appended to version 1 so that other users can see that version 1 has been validated by another user.

It is often the case that only a short even horizon is relevant in much a longer video footage. For instance, in an eight hour police incident video, only few minutes may relate to the shooting event at issue. This may motivate another user C to trim the original video footage to a much shorter video clip. User can generate self-aligned meta-hashes for the shorter video clip and commit them to the blockchain network 106 as a second version (version 2).

Further, yet another user D can compare the meta-hashes for version 1 and 2, verify the chain of custody all the way back to the point of origin, and validate that version 2 is just an excerpt of version 1. In implementations, prior versions of a current version can be stored. This way, a provenance trail of the chain of custody can be stored and presented using smart contract 604.

Having described an example use case of the technology disclosed, the discussion now turns to an example blockchain storage block.

Blockchain Storage Block

Figure 8:
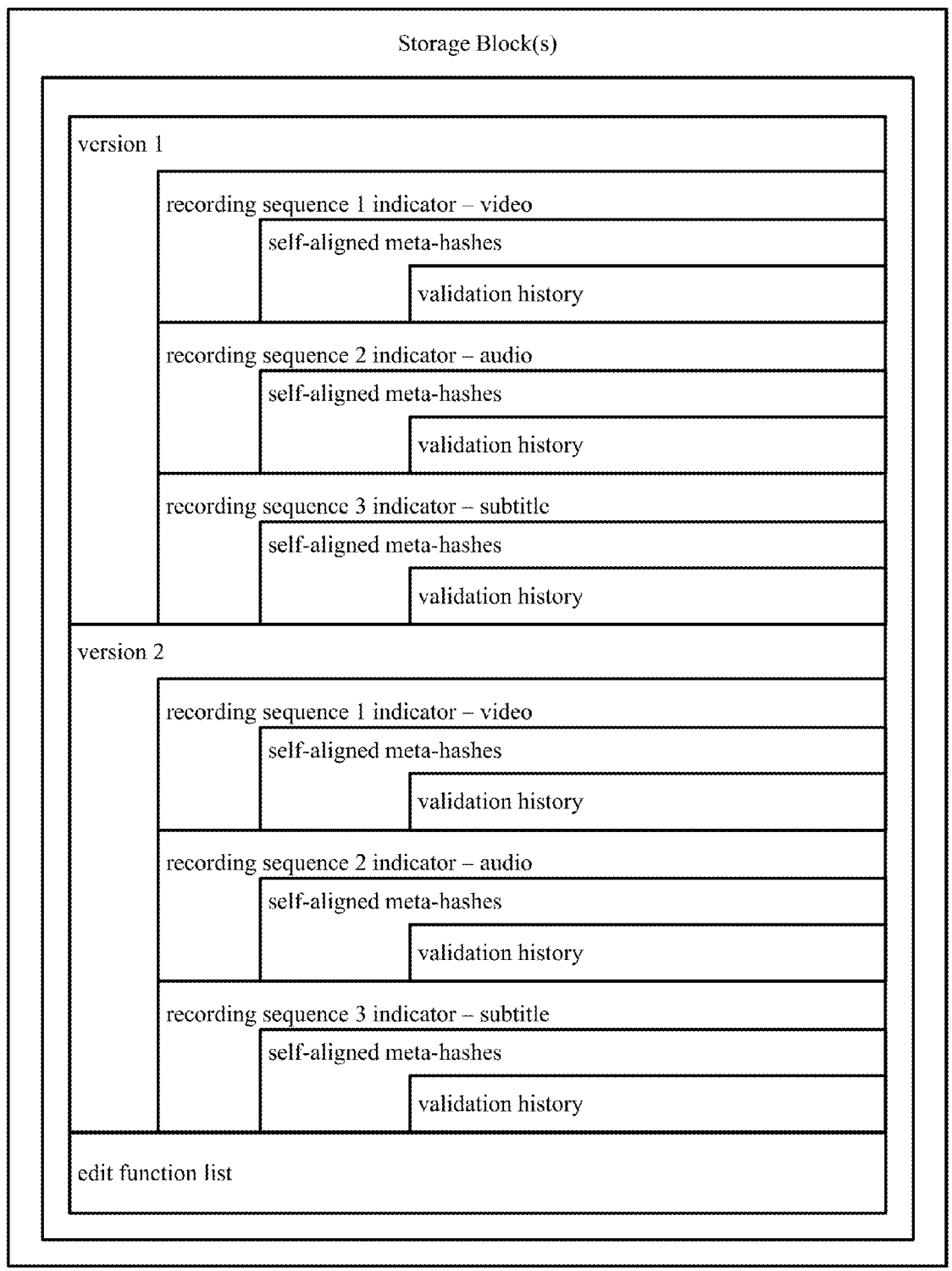
FIG. 8 illustrates an example storage block of a blockchain network that implements the technology disclosed.

FIG. 8 illustrates an example storage block(s) 800 of the blockchain network 106 that implements the technology disclosed. Storage block(s) 800 identifies two versions of a recording file: version 1 and version 2. For each version, the storage block(s) 800 identifies self-aligned meta-hashes and validation history associated with multiple recording sequences or tracks. In addition, the storage block(s) 800 also includes the edit function list of functions that transformed blocks of the initially collected recording sequence. A rendered recording sequence can be created by applying the edit function list to blocks of the edited recording sequence and linking the rendered recording sequence back to the edited recording sequence and the edit function list. The storage block(s) 800 can also include other components which are not shown in FIG. 8, such as header, nonce, balance, storageroot, codehash, gasPrice, gasLimit, to, value, signature, ommers hash, beneficiary, state root, transactions root, receipts root, logs bloom, difficulty, number, gas limit, gas used, timestamp, extra data, and mixhash.

One skilled in the art would appreciate that, in other implementations, the versions and associated meta-hashes shown in FIG. 8 can be distributed across multiple storage blocks.

Having described an example blockchain storage block, the discussion now turns to a sample smart contract implementing the technology disclosed.

Sample Smart Contract

Solidity™ code for a sample smart contract implementing the technology disclosed is provided below:

```
pragma solidity ^0.4.0;
/// @title Validating hashes of video.
contract Validator
    bytes32 identifier;
    // represents a single assessor.
    struct Assessor
    bool authority; // if true, that person can assess
    }
    // represents a collection of blocks.
    struct Collection
    {
    bytes32 hash; // the hash of hashes
    mapping(address=>Assessor) collection_assessors; // list
        of assessors that have agreed this collection is correct
    uint assessorCount;
    }
    // represents each track of a version, which contains
        multiple collections
    struct Track
    {
    mapping(uint256=>Collection) collections; // collections
        in the track
    }
    // Represents a version of a document, which contains
        multiple tracks
    struct Version
    {
    mapping(uint8=>Track) tracks;
    bytes32 name;
    uint256 previousVersion;
    }
    address public chairperson;
    // the list of authorized assessors
    mapping(address=>Assessor) public assessors;
    // A dynamically-sized array of 'Version'
    Version[ ] public versions;
    // constructor. requires the ID of the submitter of the
        contract
    function Validator(bytes32 id) {
    chairperson=msg.sender;
    identifier=id;
    assessors[msg.sender]=Assessor({authority: true});
    }
    function authorizeIndividual(address assessor)
        if (msg.sender !=chairperson)
            throw;
        }
        assessors [assessor]=Assessor({authority: true});
    }
    function createVersion(bytes32 versionName, uint256
        previous) {
        if (msg.sender==chairperson||assessors [msg.sender]
            .authority) {
            versions.push(Version({name: versionName, previousVersion: previous}));
        }
    }
    function getVersionCount( ) constant returns (uint256 v)
    {
        v=versions.length;
    }
    function getCollectionHash(uint versionID, uint8
        trackID, uint256 collectionID) constant returns
        (bytes32 hash) {
        hash=versions[versionID].tracks[trackID].collections
            [collectionID].hash;
    }
    function getAssessorCount(uint versionID, uint8 trackID,
        uint256 collectionID) constant returns (uint count) {
        count=versions[versionID].tracks[trackID].collections
            [collectionID].assessorCount;
    }
    function wasCollectionAssessedBy(uint versionID, uint8
        trackID, uint256 collectionID, address a) constant
        returns (bool validated) {
        validated=versions[versionID].tracks[trackID].collections[collectionID].collection_assessors[a].authority;
    }
}
```

Having described a sample smart contract implementing the technology disclosed, the discussion now turns to some particular implementations of the technology disclosed.

Particular Implementations

The technology disclosed relates to detecting and preventing file tampering.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to the memory. The memory is loaded with computer instructions to securely authenticate a recording file from initial collection through post-production and distribution.

First, the system calculates and stores block-level hashes for an initially collected recording sequence in the recording file.

Then, the system calculates and stores self-aligned meta-hashes for the initially collected recording sequence. It does so by—(1) applying a modulo function to the block-level hashes to calculate remainders of the block-level hashes, (2) using the remainders to identify meta-block boundaries, (3) defining meta-blocks using consecutive meta-block boundaries, and (4) group hashing the block-level hashes of the meta-blocks to produce the self-aligned meta-hashes for the initially collected recording sequence.

After post-production editing of the initially collected recording sequence that produces an edited recording sequence, the system repeats—(1) the calculating and storing of the block-level hashes for the edited recording sequence and (2) the calculating and storing of the self-aligned meta-hashes for the edited recording sequence.

The system then compares sequences of the self-aligned meta-hashes for the initially collected recording sequence and the edited recording sequence to securely authenticate block sequences in the edited recording sequence as excerpted from the initially collected recording sequence.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The recording sequence can be a video sequence, the block-level hashes can be frame-level hashes, the meta-block boundaries can be meta-frame boundaries, the meta-blocks can be meta-frames, and the block sequences can be frame sequences.

The recording sequence can be an audio sequence, the block-level hashes can be segment-level hashes, the meta-block boundaries can be meta-segment boundaries, the meta-blocks can be meta-segments, and the block sequences can be segment sequences.

The recording sequence can be a subtitle sequence, the block-level hashes can be sample-level hashes, the meta-block boundaries can be meta-sample boundaries, the meta-blocks can be meta-samples, and the block sequences can be sample sequences. In some implementations, the subtitle sequence can be repurposed for recording a custom data format. In one implementation, the custom data format can be location measurements. In another implementation, the custom data format can be bio response measurements.

In one implementation, the post-production editing can include prepending blocks to the initially collected recording sequence. In another implementation, the post-production editing can include postpending blocks to the initially collected recording sequence. In yet another implementation, the post-production editing can include trimming blocks from the initially collected recording sequence. In a further implementation, the post-production editing can include inserting blocks into the initially collected recording sequence.

The video sequence, the audio sequence, and the subtitle sequence can be interleaved in the recoding file. In such implementations, the self-aligned meta-hashes can be generated for each of the video sequence, the audio sequence, and the subtitle sequence and used to securely authenticate the recording file from initial collection through post-production and distribution.

Matches between the sequences of the self-aligned meta-hashes for the initially collected recording sequence and the edited recording sequence can be used to determine and show from where in the initially collected recording sequence block sequences in the edited recording sequence were excerpted.

At least some of the self-aligned meta-hashes can be committed to a blockchain network in accordance with a smart contract. The smart contract can—(1) accumulate in a storage block on the blockchain network the self-aligned meta-hashes for the initially collected recording sequence as a first version, (2) make the first version available for retrieval and data origin validation of the initially collected recording sequence and append the validation to the first version for storage in the storage block, (3) accumulate in the storage block the self-aligned meta-hashes for the edited recording sequence as a second version, and (4) make the second version available for retrieval and data origin validation of the edited recording sequence and append the validation to the second version for storage in the storage block.

The storage block can retain an edit function list of functions that transformed blocks of the initially collected recording sequence. A rendered recording sequence can be created by applying the edit function list to blocks of the edited recording sequence and linking the rendered recording sequence back to the edited recording sequence and the edit function list.

The modulo function can be applied to a selected subset of bits within a block-level hash that is fewer than all of the bits of the block-level hash. A dividend can be determined to be used in the modulo function based on a number of hashes to be generated, on average, per length of a recording sequence.

A decentralized application (DApp) can be used to authenticate the recording file from initial collection through post-production and distribution.

Other implementations may include a non-transitory computer readable storage medium storing instructions executable by a processor to perform functions of the system described above. Yet another implementation may include a method performing the functions of the system described above.

A method implementation of the technology disclosed includes securely authenticating a recording file from initial collection through post-production and distribution.

First, the method includes calculating and storing block-level hashes for an initially collected recording sequence in the recording file.

Second, the method includes calculating and storing self-aligned meta-hashes for the initially collected recording sequence. This is achieved by—(1) applying a modulo function to the block-level hashes to calculate remainders of the block-level hashes, (2) using the remainders to identify meta-block boundaries, (3) defining meta-blocks using consecutive meta-block boundaries, and (4) group hashing the block-level hashes of the meta-blocks to produce the self-aligned meta-hashes for the initially collected recording sequence.

After post-production editing of the initially collected recording sequence that produces an edited recording sequence, the method includes repeating—(1) the calculating and storing of the block-level hashes for the edited recording sequence and (2) the calculating and storing of the self-aligned meta-hashes for the edited recording sequence.

The method then includes comparing and aligning sequences of the self-aligned meta-hashes for the initially collected recording sequence and the edited recording sequence to securely authenticate block sequences in the edited recording sequence as excerpted from the initially collected recording sequence.

Each of the features discussed in this particular implementation section for the system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the method described above.

Each of the features discussed in this particular implementation section for the system implementation apply equally to the CRM implementation. As indicated above, all the system features are not repeated here and should be considered repeated by reference.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of securely authenticating a recording file from initial collection through post-production and distribution, the method including:
   calculating and storing block-level hashes for an initially collected recording sequence in the recording file;
   calculating and storing self-aligned meta-hashes for the initially collected recording sequence by
      applying a modulo function to the block-level hashes to calculate remainders of the block-level hashes,
      using the remainders to identify meta-block boundaries,
      defining meta-blocks using consecutive meta-block boundaries, and
      group hashing the block-level hashes of the meta-blocks to produce the self-aligned meta-hashes for the initially collected recording sequence;
   after post-production editing of the initially collected recording sequence to produce edited recording sequence, repeating the calculating and storing of the block-level hashes for the edited recording sequence and the calculating and storing of the self-aligned meta-hashes for the edited recording sequence; and
   comparing and aligning sequences of the self-aligned meta-hashes for the initially collected recording sequence and the edited recording sequence to securely authenticate block sequences in the edited recording sequence as excerpted from the initially collected recording sequence.

2. The method of claim 1, wherein the recording sequence is a video sequence, the block-level hashes are frame-level hashes, the meta-block boundaries are meta-frame boundaries, the meta-blocks are meta-frames, and the block sequences are frame sequences.

3. The method of claim 1, wherein the recording sequence is an audio sequence, the block-level hashes are segment-level hashes, the meta-block boundaries are meta-segment boundaries, the meta-blocks are meta-segments, and the block sequences are segment sequences.

4. The method of claim 1, wherein the recording sequence is a subtitle sequence, the block-level hashes are sample-level hashes, the meta-block boundaries are meta-sample boundaries, the meta-blocks are meta-samples, and the block sequences are sample sequences.

5. The method of claim 4, further including repurposing the subtitle sequence for recording a custom data format.

6. The method of claim 5, wherein the custom data format includes location measurements.

7. The method of claim 5, wherein the custom data format includes bio response measurements.

8. The method of claim 1, wherein the post-production editing includes prepending blocks to the initially collected recording sequence.

9. The method of claim 1, wherein the post-production editing includes postpending blocks to the initially collected recording sequence.

10. The method of claim 1, wherein the post-production editing includes trimming blocks from the initially collected recording sequence.

11. The method of claim 1, wherein the post-production editing includes inserting blocks into the initially collected recording sequence.

12. The method of claim 1, wherein the video sequence, the audio sequence, and the subtitle sequence are interleaved in the recoding file, further including generating the self-aligned meta-hashes for each of the video sequence, the audio sequence, and the subtitle sequence to securely authenticate the recording file from initial collection through post-production and distribution.

13. The method of claim 1, further including using matches between the sequences of the self-aligned meta-hashes for the initially collected recording sequence and the edited recording sequence to determine and show from where in the initially collected recording sequence block sequences in the edited recording sequence were excerpted.

14. The method of claim 1, further including committing at least some of the self-aligned meta-hashes to a blockchain network in accordance with a smart contract that:
- accumulates in a storage block on the blockchain network the self-aligned meta-hashes for the initially collected recording sequence as a first version;
- makes the first version available for retrieval and data origin validation of the initially collected recording sequence and appends the validation to the first version for storage in the storage block;
- accumulates in the storage block the self-aligned meta-hashes for the edited recording sequence as a second version; and
- makes the second version available for retrieval and data origin validation of the edited recording sequence and appends the validation to the second version for storage in the storage block.

15. The method of claim 14, further including retaining in the storage block an edit function list of functions that transformed blocks of the initially collected recording sequence.

16. The method of claim 15, further including creating a rendered recording sequence by applying the edit function list to blocks of the edited recording sequence and linking the rendered recording sequence back to the edited recording sequence and the edit function list.

17. The method of claim 1, further including applying the modulo function to a selected subset of bits within a block-level hash that is fewer than all of the bits of the block-level hash.

18. The method of claim 1, further including determining a dividend to be used in the modulo function based on a number of hashes to be generated, on average, per length of a recording sequence.

19. The method of claim 1, further including using a decentralized application (DApp) to authenticate the recording file from initial collection through post-production and distribution.

20. The method of claim 1, further including generating nested levels of hashes of hashes, with self-aligned uber-hashes generated from self-aligned super-hashes and the self-aligned super-hashes generated from the self-aligned meta-hashes.

21. The method of claim 1, further including subjecting the block-level hashes to multiple modulo functions with different dividends to produce varying remainders of the block-level hashes, varying meta-block boundaries, varying meta-blocks, and varying self-aligned meta-hashes for the initially collected recoding sequence.

22. A system including one or more processors coupled to memory, the memory loaded with computer instructions to securely authenticate a recording file from initial collection through post-production and distribution, the instructions, when executed on the processors, implement actions comprising:
- calculating and storing block-level hashes for an initially collected recording sequence in the recording file;
- calculating and storing self-aligned meta-hashes for the initially collected recording sequence by
  - applying a modulo function to the block-level hashes to calculate remainders of the block-level hashes,
  - using the remainders to identify meta-block boundaries,
  - defining meta-blocks using consecutive meta-block boundaries, and
  - group hashing the block-level hashes of the meta-blocks to produce the self-aligned meta-hashes for the initially collected recording sequence;
- after post-production editing of the initially collected recording sequence to produce edited recording sequence, repeating the calculating and storing of the block-level hashes for the edited recording sequence and the calculating and storing of the self-aligned meta-hashes for the edited recording sequence; and
- comparing and aligning sequences of the self-aligned meta-hashes for the initially collected recording sequence and the edited recording sequence to securely authenticate block sequences in the edited recording sequence as excerpted from the initially collected recording sequence.

23. A non-transitory computer readable storage medium impressed with computer program instructions to securely authenticate a recording file from initial collection through post-production and distribution, the instructions, when executed on a processor, implement a method comprising:
- calculating and storing block-level hashes for an initially collected recording sequence in the recording file;
- calculating and storing self-aligned meta-hashes for the initially collected recording sequence by
  - applying a modulo function to the block-level hashes to calculate remainders of the block-level hashes,
  - using the remainders to identify meta-block boundaries,
  - defining meta-blocks using consecutive meta-block boundaries, and
  - group hashing the block-level hashes of the meta-blocks to produce the self-aligned meta-hashes for the initially collected recording sequence;
- after post-production editing of the initially collected recording sequence to produce edited recording sequence, repeating the calculating and storing of the block-level hashes for the edited recording sequence and the calculating and storing of the self-aligned meta-hashes for the edited recording sequence; and
- comparing and aligning sequences of the self-aligned meta-hashes for the initially collected recording sequence and the edited recording sequence to securely authenticate block sequences in the edited recording sequence as excerpted from the initially collected recording sequence.

* * * * *